Oct. 2, 1928.

R. S. SANFORD

BRAKE DRUM

Filed Sept. 19, 1927

1,686,346

INVENTOR
ROY S. SANFORD
BY
M. W. McConkey
ATTORNEY

Patented Oct. 2, 1928.

1,686,346

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE DRUM.

Application filed September 19, 1927. Serial No. 220,318.

This invention relates to brake drums and is illustrated as embodied in a drum for an internal expanding automobile brake. An object of the invention is to provide in a brake drum means for compensating for the effect of heat in expanding the drum, preferably by providing the drum with means affected equally and in the reverse direction by the heat.

One of the most serious problems in designing and adjusting brakes is the effect of the high degree of heat which is developed when the brake is applied, in expanding the brake drum. In descending a long hill, when the brake is applied almost continuously for a considerably period of time, the drum is heated to such a degree that it expands in an amount which is very much greater than the sum total of all of the manufacturing errors and tolerances and the like which are present in the brake. It is extremely difficult to design a brake which will have proper leverages, etc., when the drum is cold and which will not lose its effectiveness when the drum expands away from the shoes of the brake.

According to my invention, I have provided the drum (on its inner face in the case of an internal expanding brake), with means which is expanded in the opposite direction, that is, inwardly, by the heat of the brake in an amount which approximately compensates for the expansion of the drum, so that the braking surface proper remains substantially constant in diameter regardless of the effect of heat.

In the illustrated embodiment of the invention, this is accomplished by providing a steel drum with an aluminum lining which expands inwardly enough to compensate for the outward expansion of the drum, and which may be faced with steel segments forming a cylindrical braking surface which is approximately continuous.

The above and other objects and features of the invention will be apparent from the following description of the illustrative embodiment shown in the accompanying drawing, in which.

Figures 1, 2:
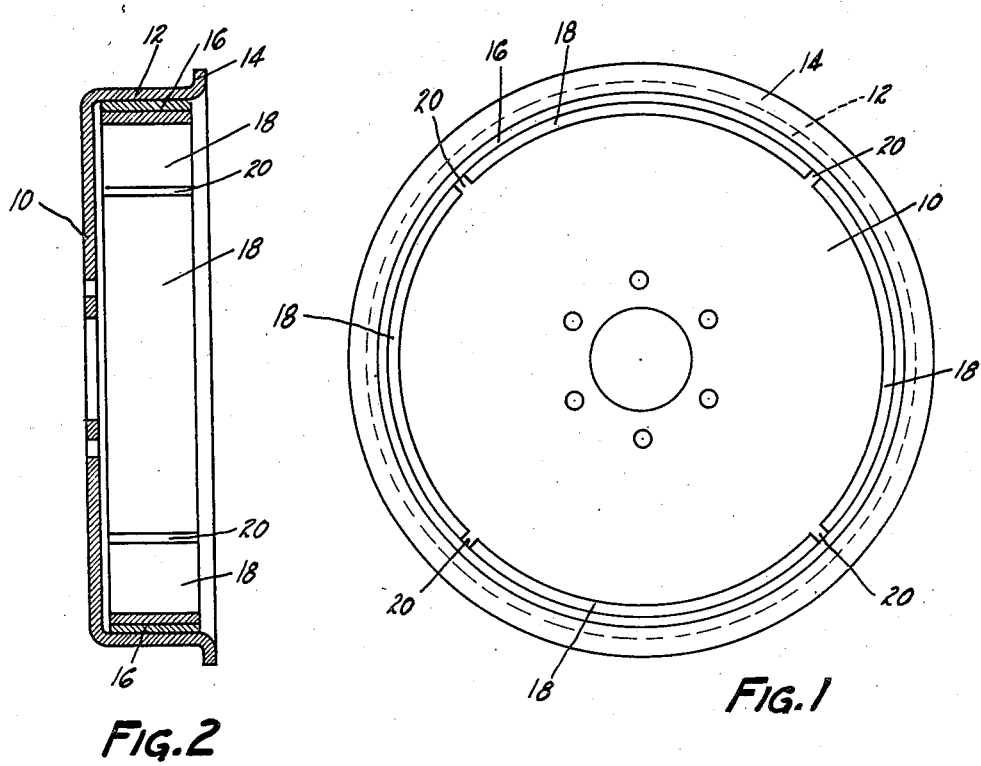
Figure 1 is an inside elevation of my novel brake drum.
Figure 2 is a diametrical section through the brake drum.

The illustrated drum includes a steel pressing or stamping having a head 10 and a substantially cylindrical braking flange 12, which may or may not have a reinforcing flange 14 at its free edge. Within the braking flange 12 of the drum is arranged a lining 16 of aluminum of such a thickness that heat causes it to increase in thickness in an amount which is proportionate to the expansion of the drum 12, in such a manner as to preserve approximately constant the inner diameter of steel facings 18 secured in any desired manner to the inner face of the aluminum lining 16. While the steel segments 18 are separated by short gaps 20 so that they will not buckle under excessive heat, they form a substantially continuous braking surface which is constant in diameter, the gaps 20 being too short to have any undesirable effect on the brake shoes.

While one illustrative embodiment of the invention has been described in detail, it is not my intention to limit its scope to that particular embodiment or otherwise than by the terms of the appended claims.

I claim:

1. A brake drum which is expansible under the influence of heat, in combination with a member mounted on said drum and which is reversely affected by heat in such a manner as to maintain the braking surface of the drum approximately constant.

2. A brake drum having a substantially cylindrical braking flange which is expanded by the influence of heat, in combination with a lining secured to said flange and affected by heat in such a manner as to maintain its inner surface substantially constant in diameter regardless of the expansion of said flange.

3. A brake drum having a substantially cylindrical braking flange which is expanded by the influence of heat, in combination with a lining secured to said flange and affected by heat in such a manner as to maintain its inner surface substantially constant in diameter regardless of the expansion of said flange, together with a series of segments secured to the inner face of said lining and adapted to be engaged by the brake.

In testimony whereof, I have hereunto signed my name.

ROY S. SANFORD.